United States Patent [19]
Renna

[11] Patent Number: 5,096,650
[45] Date of Patent: Mar. 17, 1992

[54] METHOD OF FORMING PAPERBOARD CONTAINERS

[75] Inventor: Douglas J. Renna, Valley Stream, N.Y.

[73] Assignee: Network Graphics, Inc., Valley Stream, N.Y.

[21] Appl. No.: 662,488

[22] Filed: Feb. 28, 1991

[51] Int. Cl.⁵ .............................. B29C 43/02
[52] U.S. Cl. .................... 264/322; 162/226; 162/227; 229/2.5 R; 264/324
[58] Field of Search ........... 264/320, 324, 322; 229/2.5 R; 162/218, 223, 225, 226, 227

[56] References Cited

U.S. PATENT DOCUMENTS

| | | | |
|---|---|---|---|
| 4,491,502 | 1/1985 | Martin, Jr. | 162/218 |
| 4,508,595 | 4/1985 | Gasland | 162/145 |
| 4,510,019 | 4/1985 | Bartelloni | 162/141 |

Primary Examiner—James Lowe
Attorney, Agent, or Firm—Bauer & Schaffer

[57] ABSTRACT

A paperboard, containing a major portion of cellulose and a minor portion of an uncured biodegradable latex polymer, is molded into a shaped packaging form.

4 Claims, 1 Drawing Sheet

METHOD OF FORMING PAPERBOARD CONTAINERS

FIELD OF THE INVENTION

The present invention relates to a formed paperboard product and, in particular, to a process for preparing formed paperboard pieces for the purpose of packaging, protecting, insulating, and displaying other products.

BACKGROUND OF THE INVENTION

Various formed shaped packagings are well known. Packaging which has a conforming space to the product it contains and in which the product is snuggly fit has become well known as it not only protects the product but also produces a distinctive and aesthetic promotional container. For example, expensive consumer goods such as bottled perfumes, bottled or canned goods, fruits, candies, and the like, are sold in this type of packaging. A formed and shaped package is most effective in handling such goods during storage and transportation as well as in displaying the goods at the point of purchase.

For a long time most product packages were formed of paper or cardboard materials. Such materials were easy to permit one to provide attractive displays and to provide the necessary printed information for use of the product.

More recently, plastics have taken a prominent position as the material of choice for shaped and product conforming packaging because it can easily be molded into a variety of shapes, sizes, and colors in accord with the needs of the product as aforementioned. However, today's society has increasingly focused upon the negative environmental consequences presented by the use of plastics, particularly in packaging, where the material is often discarded shortly after purchase of the product therein. Another drawback of plastic material is that it is hard to work with, requiring experienced operators and special equipment, particularly vacuum forming molds using excessive amounts of energy.

Packaging materials made from paperboard overcome the environmental consequences of plastic packaging material because of its superior biodegradability. Unfortunately, paperboard material does not have the formability of plastics and must often be made by cutting, folding, and gluing into the desired shape. This procedure has the drawbacks of having additional steps in the manufacturing process, thereby increasing the time and cost necessary to produce such packaging in addition to generating waste. Paperboard packages have the disadvantages of being relatively easy to distort and destroy during transport, and they are not stable when wet or exposed to extremes of light, heat, and humidity.

It is the object of the present invention to provide a shaped, product conforming package which embodies the characteristics of both paperboard and plastics without the disadvantages and ecological drawbacks of either.

It is another object of the present invention to provide a product packaging material having the favorable biodegradability characteristics of paperboard.

It is another object of the present invention to provide a sufficiently rigid paperboard packaging material able to contain, protect, insulate, or display the product therein.

It is yet another object of the present invention to provide a paperboard packaging material which can be molded into complex shapes without need for cutting, folding, and gluing into shape.

It is still another object of the present invention to provide a process for molding a basically paperboard material into packaging material while satisfying the aforementioned objects.

Other objects and advantages of the present invention will be apparent to those skilled in the art from the following disclosure.

SUMMARY OF THE INVENTION

In accordance with the present invention, a novel package is provided comprising a molded shaped body formed of paperboard impregnated with a water soluble and biodegradable latex polymer. The impregnated paperboard is placed in an open mold where it is formed into a specific predetermined shape under moisture, heat and pressure. During the molding, the latex polymer is subjected to such heat that it flows and fuses together into a cured and rigid state, incorporating therewith the fibrous material of the paperboard.

Full details of the present invention are set forth in the following description.

DETAILED DESCRIPTION OF THE PRESENT INVENTION

Figure 1:
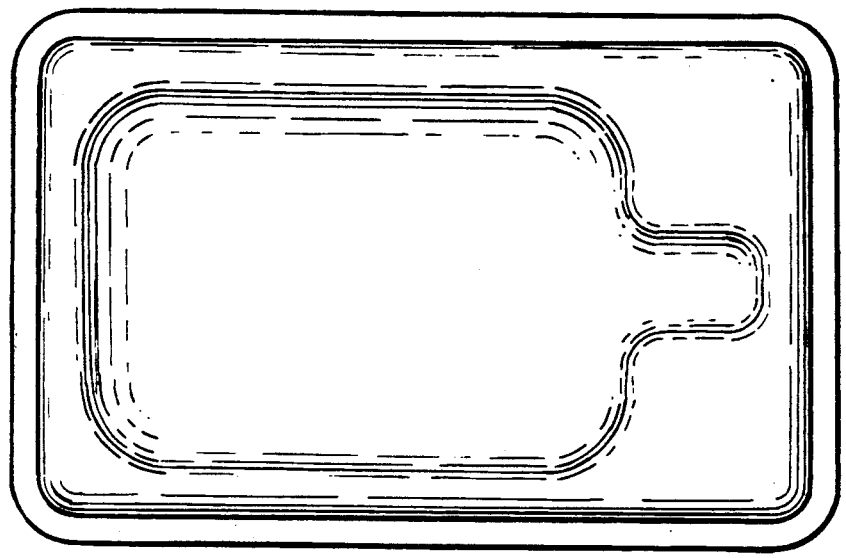
FIG. 1 is a perspective view of a package made in accordance with the present invention.

The package of the present invention is constructed of a paperboard sheet stock comprising a mixture of a major portion of comminuted cellulose fibers and a minor portion of an uncured water soluble and biodegradable latex polymer binder, cast and rolled by conventional methods. Preferably, the cellulose and latex polymer were uniformly mixed so that the polymer impregnates and surrounds the cellulose fibers uniformly prior to the casting into the sheet form. If desired, additional components may have been added to the mixture such as coloring agents, powders, flecks, and the like.

The polymer impregnated paperboard is cut into a sheet of desired working size and heated to a temperature just below the glass transition point of the polymer and thereafter charged into an open mold having male and female halves of the desired shape for ultimate packaging or product. The mold is preheated to avoid phase change to the surface of the sheet, and thereafter the temperature of the mold is raised to elevate the temperature of the impregnated paperboard to the fusion point of the latex polymer. The sheet is simultaneously compressed on closing the mold and is kept in the heated mold for a time sufficient to fully cure the latex polymer and thus form a rigid shaped form.

The impregnated paperboard sheet is introduced into the mold while warm and somewhat moistened. In this way greater fuel economy is obtained as a result of not having to heat the sheet excessively in the mold. The premoistened sheet is advantageous in providing a saturated heat in the mold which is able to penetrate through the entire sheet for more even molding. Upon removal of the completed molded form, the formed package body is allowed to air cool and finally set and fixed.

Conventional male and female compression molds may be used. The mold may be made in any shape or size conforming to the product to be contained in the final package, although it is preferred that they be provided with radiused edges and mating interior draw angles of greater than 90% so that sharp corners or hidden cavities are avoided. Clearances between the mold halves will be selected in dependence upon the product to be made, although it is preferred to maintain such clearances to a minimum in order to simultaneously compress and densify the wall thickness of the sheet.

A suitable impregnated paperboard stock is provided by James River Corporation of Fitchburg, Mass., under the product name JR101-54. This stock material is a mixture of relatively short fibers with about 30 percent of an uncured latex polymer. The material is formed and supplied in a relatively endless roll of sheet of a thickness between about 0.030 and 0.034 gauge. Such material is known only for use as counterboard in a die press embossing operation and has never been used to mold compressed shaped products or packaging. Other starting materials having longer pulp fiber, different polymer content, and heavier material gauge may be used for specific forming applications.

The starting paperboard may be made by casting and/or rolling an aqueous slurry of fibrous stock into thickness from about 0.010 gauge to about 0.040 gauge. The nature of the fiber stock in the paperboard sheet is not critical, but the fibers should not be so pretreated as to reject or not bind ultimately with the latex polymer. The paper pulp may be of long or short fibers or a mixture thereof which may range between 1 and 5 mm. Typical of hardwoods (short fibers) and softwoods (long fibers) that are used by papermakers, the impregnated paperboard material may have pure cellulose or conventional cellulose mixtures with or without additives such as soluble binders, starches, colorings, etc. before mixture with the latex polymer. It may be virgin stock or recycled material.

The latex polymer used in the manufacture of such paper stock may be of the type used currently in the formation of milk containers or cartons should a nontoxic, biodegradable end product be desired, and references to the specification of such products can be easily incorporated herein. A water dispersed nonflammable latex is preferred. Other types of latex polymers may also be used. Such polymers are exemplified by: styrene/butadiene copolymers, vinyl acetate polyvinyl chloride, polyacrylate esters, and polymethacrylate esters. In the paper stock the amount of latex polymer should be between 20 to 40 percent. An amount of about 30 percent is found most desirable. The percent is taken by weight throughout the disclosure.

Heating of the impregnated paperboard sheet may be accomplished in suitably humidified, heated autoclaves, while the mold may be conventional thermoforming equipment. The temperature during molding is kept between about 150 and 300 degrees Farenheit, depending upon the impregnation density and material gauge. Preferably, a range of between 200 and 250 degrees Farenheit produces the most optimum results. A small amount of water or steam may be desirably sprayed on the paperboard prior to compression to promote uniform heat dispersion and ultimate polymer binding and formability. Thermoforming is usually conducted at or above the glass transition temperature of the polymer of choice.

Pressure on the impregnated paperboard sheet within the mold may be as high as 300 to 400 psi to insure proper shaping upon set up of the latex polymer. Of course, pressure and temperature can be varied to suit the working material. During compression, the thickness of the impregnated paperboard sheet is reduced (i.e. density increased) as a result of the smaller mold separation to about ⅔ the starting thickness. This increases strength and rigidity but still maintains the paperboard significantly less friable than ordinary plastic sheet. The sheet is held in the mold for between 5 seconds to several minutes depending upon the thickness, polymer, and other factors.

The end product shape may be augmented with ribs, flanges, tabs, and other variations during the molding stage to conform to the end use to which the product is to be put. Various dyes and colorations may be included in the impregnated mixture prior to molding, and the finished product may be imprinted and colored as desired.

Although the paper stock is subjected to heat and pressure, setting of the polymer does not convert the polymer to a nonsoluble state, and the finished product remains easily biodegradable.

The following are specific examples.

EXAMPLE I

A sheet of approximately 4×4 inches is cut from a roll of JR101-554, James River paper stock, having a guage of about 0.02. The stock is moistened and placed in an oven containing a moisture keeping heat. The stock is heated slowly to about a 200 degree temperature (i.e. the glass transistion point of the polymer). It is then placed over the female portion of an open, preheated thermoforming mold (with approximately a 0.0003 clearance from male to female). The boat-like body (see FIG. 1), having a cavity in which may be nestled a perfume bottle. The mold is closed at about 300 psi and retains the preheat temperature of 200 degrees. The sheet is kept in the mold under pressure for about 5 seconds, and the latex in the sheet sets into a fixed form. The molded body is then removed and allowed to cool. It may be used in this form.

EXAMPLE II

A paper stock starting material is formed comprising a slurry containing about 70 percent of substantially long fiber (an average length of about 4 mm), cellulose fibers, both virgin and reclaimed, and 30 percent of a styrene/butadiene copolymer. The slurry is mixed until homogeneous and rolled into a sheet by the usual method.

Figure 2:
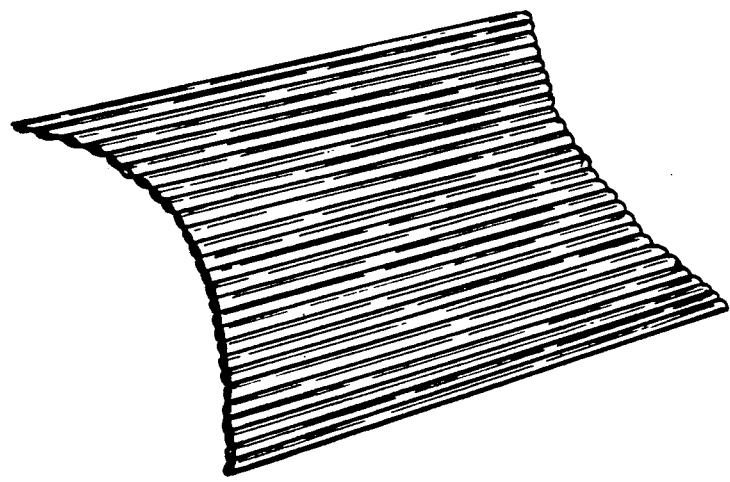
FIG. 2 is a perspective view of another package made in accordance with the present invention.

A web of approximately 12×12 inches is cut from the rolled sheet and run through a long moisture retaining heated oven. The web is then preheated to 250 degrees, after which it is inserted into the thermoforming mold as in Example I. The mold, however, is formed to provide a body flat on one surface and corrugated on the other surface (FIG. 2). The corrugated surface has closely formed ridges and valleys. The body is molded at a temperature of about 350 degrees at a pressure of 400 psi for about 20 seconds. The long fibers are advantageous in forming permanent close ridges and valleys, while the added pressure provides for increased density and strength. Upon cooling, the molded sheet was folded into a box-like form.

EXAMPLE III

Example II was followed except that the proportion of latex to cellulose was increased to a ratio of 40 p/s/i of latex to about 60 p/s/i of cellulose. The latex was a polyacrylate ester and the temperature reduced to 250 due to the increased proportion of the polymer.

EXAMPLE IV

Example II was followed except that the paper stock contained 80 percent cellulose long fibers (average 7 mm) and 20 percent latex polymer; a mold was used providing corrugations on the surface of the sheet exterior of the cavity for the object; and the sheet was held in the mold for one minute. The process is capable of producing packaging of multiple shapes and forms.

Various modifications, changes, and embodiments have been disclosed, and others will be obvious to those skilled in this art. Accordingly, it is intended that the foregoing disclosure be taken as illustrative only and not limiting of the scope of the invention.

What is claimed is:

1. A process for preparing a formed paperboard body comprising the steps of providing a paperboard sheet having a major portion of cellulose fibers and a minor portion of an uncured latex polymer; heating said sheet to approximately the glass transition point of the polymer, but below that temperature at which the polymer coverts to a non-soluble state; introducing said sheet into a mold having the shape of the desired body and subjecting said heated sheet within said mold to pressure for a period of time sufficient to form said body and set said latex into fixed form; removing said body from said mold; and cooling said body.

2. The process according to claim 1, wherein said paperboard is formed from an aqueous slurry of between 60 and 80 percent cellulose fibers and about 20 to 40 percent latex polymer.

3. The process according to claim 2, wherein said latex polymer is selected from the group consisting of styrene/butadiene copolymers, vinyl acetate polyvinyl chloride, polyacrylate esters, and polymethacrylate esters.

4. The process according to claim 1, wherein said paperboard in said mold is held at a temperature of between 150 and 300 degrees Farenheit, the pressure is held between 300 and 400 pounds per square inch, and the time of molding is between 5 seconds and 1 minute.

* * * * *